Aug. 6, 1935.  J. E. RENFER  2,010,321
FEEDING MECHANISM
Filed Sept. 13, 1932
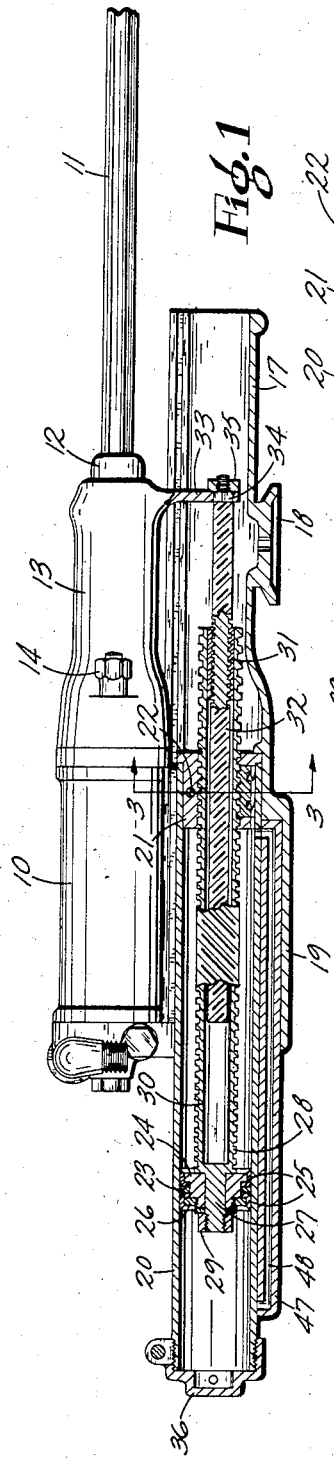
John E. Renfer
INVENTOR Patented Aug. 6, 1935

2,010,321

UNITED STATES PATENT OFFICE 2,010,321

FEEDING MECHANISM

John E. Renfer, Cleveland, Ohio, assignor to The Cleveland Rock Drill Company, Cleveland, Ohio, a corporation of Ohio Application September 13, 1932, Serial No. 632,919

4 Claims. (Cl. 121—9)

This invention relates broadly to rock drills but more particularly to feeding mechanism for rock drills of the drifter type.

One object of this invention is to provide an improved and compact feeding mechanism for rock drills.

Another object of this invention is to provide a feeding mechanism for rock drills wherein the machine is adapted to be fed toward or away from the work at a greater rate of speed than the speed of the feeding element, thus reducing the overall length of the assembly and permitting a relatively long feed.

Other objects and advantages more or less ancillary to the foregoing reside in the specific construction and aggroupment of the elements peculiar to this structure, as will become apparent from a more complete examination of this specification.

In the drawing which illustrates a preferred embodiment of the invention.

Fig. 1 is a longitudinal view partly in section of a rock drill assembly embodying the invention.

Fig. 2 is an enlarged sectional view of a portion of the assembly.

Fig. 3 is a cross sectional view taken in a plane indicated by line 3—3 in Fig. 1.

Fig. 4 is a longitudinal elevational view illustrating the end portion of the feed cylinder.

Fig. 5 is a rear end view of the portion of the feed cylinder illustrated in Fig. 4.

Fig. 6 is a cross sectional view taken in a plane indicated by line 6—6 in Fig. 5.

Figs. 7 and 8 are views similar to Fig. 6 illustrating the throttle valve in different positions.

Referring now to the drawing, the rock drill shown for the purpose of illustration comprises a cylinder 10 within which there is reciprocably mounted a piston capable of delivering blows to a drill steel 11. The drill steel is conveniently mounted within a chuck 12, which is journaled within a front housing 13 secured to the cylinder 10 by a pair of side bolts 14.

The under side of the cylinder 10, is formed with a duality of longitudinally disposed gibs 15 which are capable of slidable engagement in a corresponding groove or way 16 provided in a shell 17. For mounting purposes, the shell 17 is formed intermediate its ends with a cone 18.

One end of the shell 17 is enlarged as at 19 and capable to receive the forward portion of a relatively long tube or feed cylinder 20. Within the outer end of that forward portion, the tube is capable to snugly receive an internally screw threaded bushing or nut 21. The nut together with the tube 20 are integrally affixed within the shell 17 by a transversely disposed clamping bolt 22.

Slidably mounted within the feed cylinder 20, there is a piston 23 comprising a screw threaded sleeve 24 upon which there is mounted a plurality of packing 25, preferably made of fibrous material such as leather to afford a perfect joint with the wall of the feed cylinder. The packings are maintained upon the sleeve 24 by the engagement of a screw threaded nut 26. Within the piston 23, there is rotatably mounted the end 27 of a feed screw 28 secured therein against relative longitudinal displacement by the engagement of a screw threaded nut 29. The feed screw 28 and nut 21 are formed with a left hand thread of such a lead capable to cause the rotation of the screw when the latter is pushed or pulled through the nut 21. The screw 28 is provided with a bore 30 having, integrally within the front end thereof, a nut or internally threaded portion 31. Telescopically mounted within the bore 30 and capable of engagement with the nut 31, there is a screw 32 formed with a right hand thread. The front housing 13 of the rock drill is provided with a downwardly projecting tongue 33 formed with a square hole 34 within which one end of the screw 32 is non-rotatably mounted and secured therein by a nut 35.

Toward the left, the feed cylinder 20 is terminated by a backhead 36. Rotatably mounted within the backhead 36, there is a throttle valve 37 having a handle 38 projecting therefrom. Adjacent the handle 38, the backhead is formed with an outwardly projecting flange 39, upon which there is provided a plurality of closely spaced recesses 40. A spring pressed plunger 41 being slidably mounted within the handle 38, has its protruding end conveniently machined for engagement with the recesses 40, thus affording a locking device for any desired position of the throttle valve 37. This throttle valve is formed with a central bore 42 being in constant communication with the external wall of the valve through two radially disposed ports 43 and 44, the last port being associated with a recess 45, the purpose of which will be explained later. Another recess 46 somewhat longer than the recess 45 is also formed on the external wall of the throttle valve as illustrated in the drawing.

Leading from the throttle valve 37 into the front end of the feed cylinder 20, there is a relatively small tube 47, interior thereof constituting a fluid passage 48. Leading from the throttle valve 37 into the rear end of the cylinder 20, there is a port 49.

In the operation of the mechanism, assuming the parts to be positioned as illustrated in Fig. 1, and the throttle valve 37 positioned as illustrated in Fig. 6, pressure fluid will be admitted into the front end of the cylinder 20 from the valve bore 42, through the passages 44 and 48. The pressure fluid admitted into the front end of the cylinder will act on the piston 23 to maintain the latter in the extreme rear end position.

When it is desired to feed the rock drill slowly toward the front, the throttle valve 37 may be positioned as illustrated in Fig. 7. In this position of the throttle valve, a small amount of pressure fluid is admitted into the rear end of the feed cylinder through the valve passages 43 and port 49. Simultaneously the pressure fluid is admitted into the front end of the cylinder 20 through the throttle valve passage 44 and groove 45. However the rear actuating area of the piston 23 being larger than its front actuating area, the piston will be forced forwardly thus compressing the pressure fluid into the front end of the cylinder back into the pressure fluid conduit. It can readily be seen that any desired feeding speed may be obtained by manipulating the throttle valve 37 in such a manner as to provide a more or less complete registration of the valve passages 43 and 44 with their respective inlet passages 49 and 48.

When it is desired to bring the machine forwardly with great speed, as for instance when bringing the machine to the work, the throttle valve may then be positioned as illustrated in Fig. 8. Pressure fluid is now admitted only into the rear end of the feed cylinder through the valve passage 43 and port 49. The front end of the cylinder is vented to atmosphere through the passage 48, valve groove 46, and vent 50, thus allowing a rapid forward movement of the piston 23 and the consequential displacement of the rock drill.

When it is desired to retract the rock drill from the work the throttle valve may be positioned as illustrated in Fig. 6. In that position pressure fluid is admitted into the front end of the feed cylinder through the valve passage 44 and port 48. Pressure fluid acting upon the piston 23 will drive it rearwardly, the rear end of the cylinder 20 being opened to atmosphere through the port 49, valve groove 46 and vent 50.

During the forward or rearward displacement of the piston 23, the screw 28 will be forced through the stationary nut 21. Due to the rather long lead of its left hand thread, the screw 28 will be rotated when pushed or pulled through the nut 21, thus causing the displacement and rotation of its integral nut 31. This nut being equipped with a right hand thread cooperating with the corresponding thread of the screw 32, will cause the longitudinal displacement of the latter and the consequential displacement of the drilling motor. The displacement of the screw 32 is responsive to the longitudinal force resulting from the longitudinal movement of the piston 23 or screw 28, and to the rotation of the nut 31. Assuming the thread lead of the screw 28 and screw 32 to be identical, the longitudinal displacement of the rock drill will be twice as fast as the longitudinal displacement of the screw 28.

By providing the telescopical engagement of the screw 32 with the screw 28, the length of the assembly may be reduced to a minimum. Heretofore the screw of the feeding mechanism was positioned to extend past the front end of the machine, and consequently was subjected to the dust and chips resulting from the drilling operation. The dust mingling with the oil remaining on the screw would form an abrasive composition causing the wear of the screw during its displacement through its corresponding nut. With the end of the screw 32 falling short of the front end of the rock drill and being located behind the tongue 33, the screw is not subjected to the dust resulting from the drilling operation, reducing thereby the wear of the screw.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. The combination with a drilling motor, of a feeding mechanism therefor including a feed tube having a piston reciprocable therein, opposed actuating areas for said piston alternatively subjected to the action of the pressure fluid for actuating the latter, one of said areas being equal to the internal cross sectional area of said feed tube, an externally and internally screw threaded member associated with said piston for reciprocation therewith and capable of rotation, means responsive to the reciprocation of said member to effect its rotation, and a screw connected to said drilling motor and cooperating with the internally threaded portion of said member for transforming the reciprocation and rotary motion of the latter into a feeding motion and transmitting said feeding motion to said motor.

2. The combination with a rock drill support, of a rock drill slidable thereon, of feeding means for said rock drill comprising a feed tube having a piston reciprocable therein, opposed actuating areas for said piston alternatively subjected to the action of the pressure fluid for actuating the same, one of said areas being equal to the internal cross sectional area of said feed tube, a member associated with said piston for reciprocation therewith and capable of rotation, means externally of said member cooperating with a part of said support and responsive to the reciprocation of said member to effect its rotation, and means internally of said member cooperating with a second member connected to the drilling motor for transforming the reciprocatory and rotary motion of said first mentioned member into a feeding motion, and transmitting said feeding motion to said drilling motor.

3. The combination with a drilling motor, of feeding means therefor comprising a reciprocable external screw capable of rotation, a stationary element associated with said screw, fluid actuated means connected to said screw for effecting its reciprocation to effect its rotation by its association with said stationary element, opposed actuating areas for said means alternatively subjected to the action of the motive fluid for actuating the same, one of said areas being equal to the entire cross sectional area of said means, and a member reciprocably mounted within said screw and actuated by the latter, said member being connected to said motor for transforming its reciprocatory motion to the latter.

4. The combination with a drilling motor, of feeding means therefor comprising a cylinder having a driving member and a driven member reciprocable therein, said driving member being capable of rotation, fluid actuated means connected to said driving member to effect its reciprocation, said last means comprising a piston formed with opposed actuating areas alternatively subjected to the action of the pressure fluid for actuating the latter, one of said areas being equal to the internal cross sectional area of said cylinder, means within said cylinder cooperating with the exterior of said last mentioned member responsive to its reciprocation to effect its rotation, and cooperating means in the interior of said driving member and on the exterior said driven member for combining the reciprocation and rotation of the former into the reciprocation of the latter, and means for transmitting the reciprocation of said driven member to said motor.

JOHN E. RENFER.